INVENTOR.
ADRIAN K. DORSMAN

July 29, 1969

A. K DORSMAN 3,458,239

THREE-AXIS MAGNETIC SUSPENSION SYSTEM

Filed Oct. 2, 1967

INVENTOR.
ADRIAN K. DORSMAN

BY

ATTORNEY

United States Patent Office 3,458,239
Patented July 29, 1969

3,458,239
THREE-AXIS MAGNETIC SUSPENSION SYSTEM
Adrian K. Dorsman, Bellflower, Calif., assignor to North American Rockwell Corporation, a corporation of Delaware
Filed Oct. 2, 1967, Ser. No. 672,351
Int. Cl. F16c 39/06, 35/00
U.S. Cl. 308—10                              15 Claims

ABSTRACT OF THE DISCLOSURE

A system for magnetically suspending a rotor in which the stators have eight pole members and wherein each of the pole members has a drive coil and a pickoff coil wound thereon. Radial support is provided by connecting drive coils in parallel and to a source of AC voltage. In addition, the pickoff coils provide signals indicating the position of the rotor, which signals are fed back to the drive coils to center the rotor. Axial support is obtained through a technique of passive resonant support.

BACKGROUND OF THE INVENTION

Field of the invention

The present invention relates to low-friction bearing supports for rotating members and, more particularly, to a three-axis magnetic suspension system for supporting such members without the use of conventional bearings.

Description of the prior art

It is often desirable to provide a bearing which exhibits a minimum of friction between the stationary and movable members. Some devices, such as gyroscopes, are sensitive to the friction existing in the bearings which provide a means for mounting the relatively movable member, because such friction causes torques which adversely affect the performance of the device. For instance, in a gyroscope, any torque caused by friction normal to the spin axis will cause the gyro to precess. Bearing friction is also undesirable in meter instruments because compensation is required to remove the inaccuracies introduced as a result of such friction.

In order to minimize, and hopefully eliminate such friction, it has been proposed to use magnetic bearings because theoretically, at least, they have no friction. However, while substantially eliminating the problem of friction, magnetic bearings introduce new problems. The first magnetic bearings were generally constructed of permanent magnets. However, bearings constructed in this manner do not provide sufficient stiffness to be able to mount a relatively movable member of substantial size. In addition, no method is provided for increasing the restoring magnetic pull when the rotary member is deflected.

In order to overcome this problem, substantially all existing magnetic bearings consist of a plurality of tuned circuits which are connected in parallel to an AC power supply. Each of the tuned circuits comprises a winding wound around a ferromagnetic pole member so as to form an inductance, and a series connected capacitor. Such circuits are shown in U.S. Patent No. 3,155,437 to Kinsey et al. and U.S. Patent No. 3,184,271 to Gilinson, Jr. The value of each capacitor is adjusted so that the reactance of each capacitor-inductance combination is slightly inductive when the movable member is suspended at the center position within the bearing and such that the rate of change in flux density in the gap with respect to the gap dimension is a maximum. In other words, the tuned circuit is operated on the steepest part of the flux density vs. air gap curve or near the inflection point.

The tuned circuits operate such that when all the gaps are equal, each is operating at the same point on the flux density curve. Then, if the movable element deflects under load, this will operate to increase one gap while simultaneously decreasing the opposite gap. Consequently, the reluctance of the magnetic path is changed and so is the self-inductance of the particular coil. Because each coil is part of a tuned circuit, raising its self-inductance will reduce its current flow causing the magnetic field to reduce in intensity. Similarly, on the opposite side, the self-inductance of the winding is reduced and more current flows in it, increasing the magnetic field. In this manner, the electromagnetic field suspending the movable element automatically adjusts itself in accordance with the deflections of the movable element. When the movable element is deflected in a particular direction, the electromagnetic field reduces its pull in that direction and increases a restoring pull in the other direction so as to restore the movable member to its center position.

Although such a magnetic suspension technique is fully operative to provied a low-friction bearing support, such a system is inadequate because of a lack of stiffness of the suspension. In order to stiffen the suspension, it has been proposed to use a feedback circuit and one type of feedback circuit is disclosed in the aforementioned patent to Gilinson, Jr. In the feedback circuit disclosed therein, the change in self-inductance of the tuned circuit and the corresponding change of the current flow therein is utilized to feed a signal back to the coils in such a direction as to cause centralization of the rotor in addition to the centralizing effect obtained from the resonance condition caused by the tuned circuits.

While such a scheme is effective to improve the tuned circuit-type of magnetic suspension system by adding additional stiffness, a significant difficulty still exists due to the critical nature of the components required. In other words, in order for the movable member to be suspended at the median point, each tuned circuit must be adjusted such that when all the gaps are equal, the magnetic flux densities in each gap are equal. In order for this to be the case, the inductance of each of the coils must be equal and the capacitance of each of the capacitors must be equal. While controlling the inductance of the coils is not difficult, it is extremely difficult to adjust the capacitors so that they are equal. In fact, it is theoretically necessary to provide a perfectly matched set of capacitors. Since the operation of the bearing will depend upon how matched the capacitors are, elaborate procedures are usually employed to select matched capacitors. As a result, considerable time and money is spent in constructing the capacitors and in the procedure for selection.

SUMMARY OF THE INVENTION

According to the present invention, there is provided a magnetic suspension system for use in the support of gyro floats and other devices which require an extremely low-friction bearing support. The proposed system is a combination of dynamic support for two orthogonal radial axes and passive support for the axial axis. Axial support is obtained through a technique of passive resonant support which is similar to the technique disclosed in the aforementioned patents to Kinsey et al. and Gilinson, Jr. On the other hand, radial support is obtained with a magnetic suspension system which completely eliminates the necessity for tuned circuits and thereby permits the elimination of the extremely critical match of the capacitors used therein. This is accomplished by providing an extra set of windings on the stator pole members to operate as pickoff coils to provide signals indicative of the displacement of the movable member from the center position so as to permit centering of the movable member. In this manner, only one capacitor is required for each end support of the instrument and the stability of that capacitor is not nearly as critical as it is with the capacitors used in tuned circuits.

OBJECTS

It is, therefore, an object of the present invention to provide a three-axis magnetic suspension system for reducing the friction acting on the relatively movable member.

It is a further object of the present invention to provide a magnetic suspension system which combines dynamic support for two orthogonal radial axes and passive support for the axial axis.

It is a still further object of the present invention to provide a magnetic suspension system which uses a technique of cross-axis pickoff combined with two servo loops to provide servo control of the two orthogonal radial axes.

It is another object of the present invention to provide an improved magnetic suspension system which has a higher degree of stiffness than that possible with existing systems.

It is still another object of the present invention to provide a magnetic suspension system which permits an increase in the actual capacity of the support with a given Q in the support coils.

Another object of the present invention is to provide a magnetic suspension system which permits the elimination of the extremely critical match of capacitors necessary in existing tuned circuits.

Still other objects, features and attendant advantages of the present invention will become apparent to those skilled in the art from a reading of the following detailed description of a preferred embodiment constructed in accordance therewith, taken in conjunction with the accompanying drawings wherein:

DESCRIPTION OF THE PREFERRED EMBODIMENT

Figure 1:
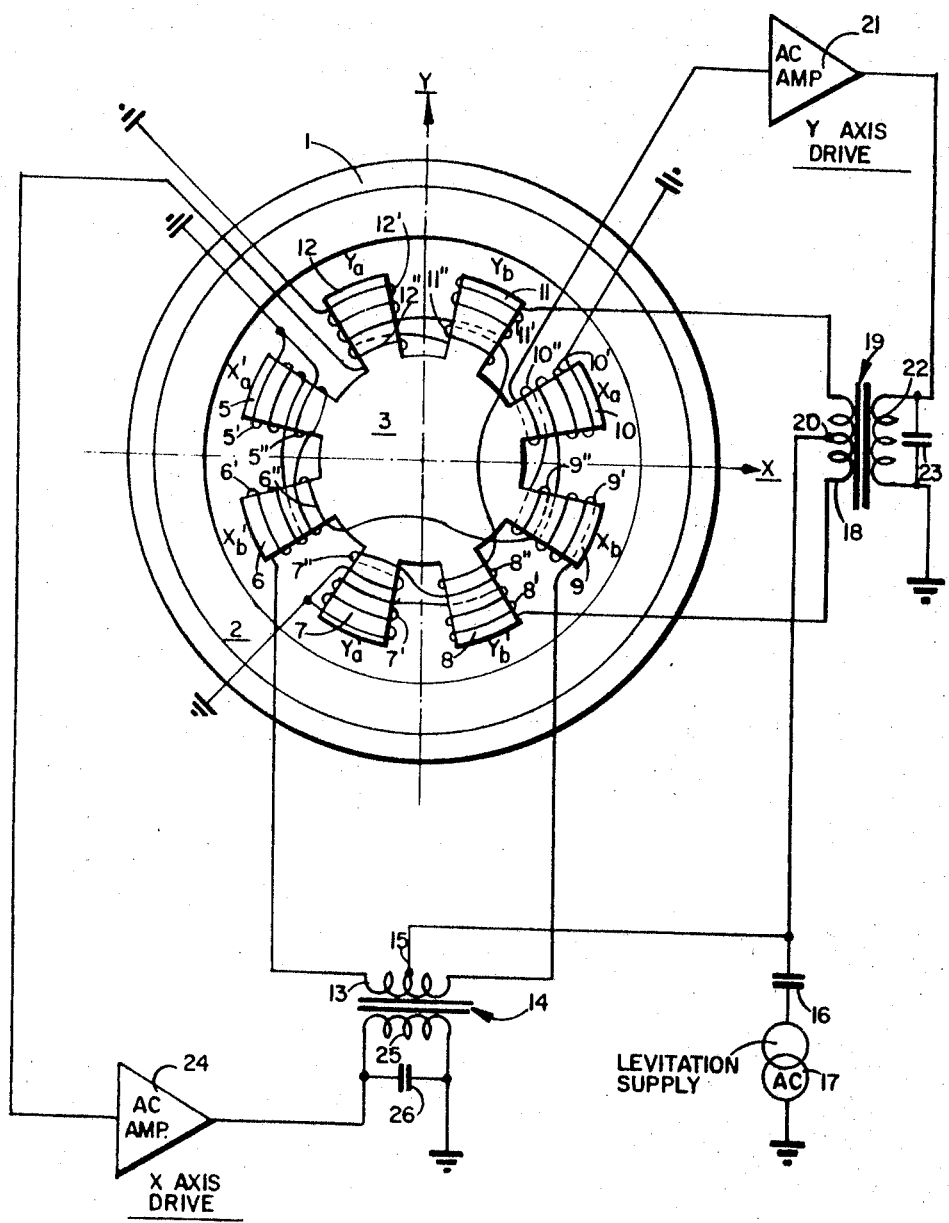
FIGURE 1 is a schematic representation of a stator arrangement for one end of a magnetic support system according to the present invention.
Figure 2:
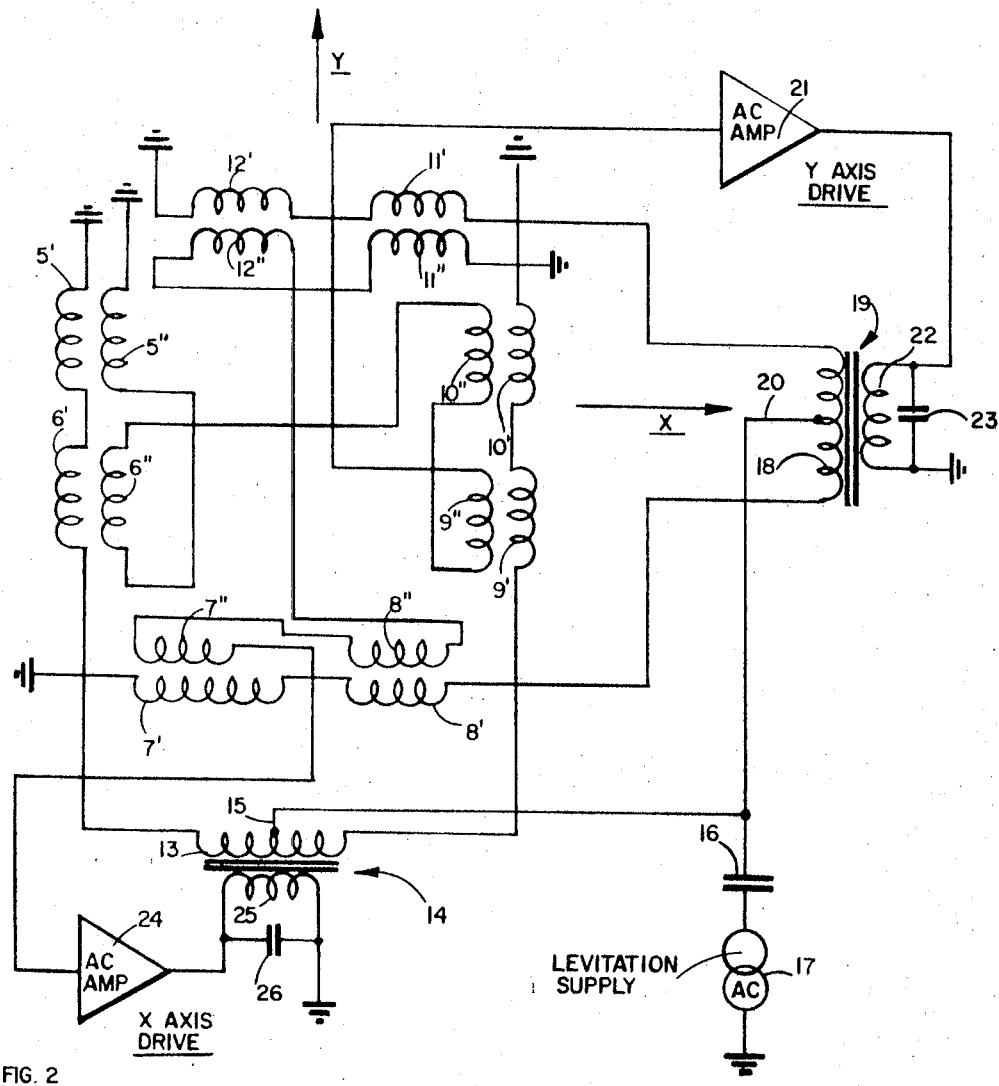
FIGURE 2 is a circuit diagram of each end stator of the magnetic support system of FIGURE 1.
Figure 3:
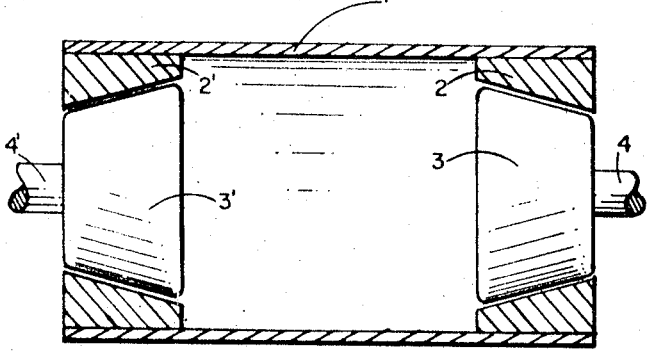
FIGURE 3 is a side view of the present magnetic bearing showing schematically the manner in which axial support is provided.

Referring now to the drawings and, more particularly, to FIGURE 1 thereof, there is shown a schematic representation of one end of the present magnetic support system, specifically showing the stator arrangement. Reference will also be made to FIGURE 2 which shows a circuit diagram of each end stator of the magnetic support system of FIGURE 1 and to FIGURE 3 which shows a side view of the present magnetic bearing. As shown in FIGURES 1 and 3, the magnetic support system is operative to support a hollow cylindrical shaft or rotor 1. Connected to rotor 1 is a pair of rings 2 and 2' of ferromagnetic material. Rotor 1 and rings 2 and 2' are mounted for movement with respect to a pair of stators 3 and 3' which may be coupled to a pair of shafts 4 and 4' for support thereof. Since stators 3 and 3' are substantially identical, a description of one will suffice to describe both.

Referring now to FIGURE 1, stator 3 is also made of magnetic material and has a plurality of poles 5–12 spaced equidistantly around the circumference thereof. Each of poles 5–12 has a pair of windings wound thereon. One winding of each pair, numbered 5' through 12', constitute a plurality of drive coils. The other winding of each pair, numbered 5" through 12", constitute a plurality of pickoff coils. The connection between windings 5'–12' and 5"–12" may be best understood with reference to FIGURE 2.

With reference to FIGURE 2, it is seen that drive coils 5' and 6' are connected in series between ground and one end of a secondary 13 of a transformer 14. Similarly, drive coils 9' and 10' are connected in series between ground and the other end of secondary 13 of transformer 14. Secondary 13 has a center tap 15 which is connected to one side of a capacitor 16, the other side of which is connected to one terminal of a source 17 of AC voltage, which operates as the levitation supply, the other terminal of which is connected to ground. Such circuitry constitutes the primary magnetic suspension for the X axis. The suspension for the Y axis is similar and consists of drive coils 7' and 8' which are connected in series between ground and one end of secondary 18 of a transformer 19 and drive coils 11' and 12' which are connected in series between ground and the other end of secondary 18 of transformer 19. Secondary 18 has a center tap 20 which is connected to said one side of capacitor 16.

While the just described circuitry is operative to suspend rotor 1 with respect to stator 3, there is no guarantee that rotor 1 will be centered. Therefore, in order to maintain rotor 1 centered with respect to stator 3, a positive feedback loop is provided to sense deviation of rotor 1 from the center position and to provide an error signal proportional thereto. Such an error signal is provided by pickoff coils 5"–12". From FIGURE 2 it is seen that coils 5", 6", 10" and 9" are connected in series between ground and the input of an AC amplifier 21, the output of which is connected to one end of a primary 22 of transformer 19, the other end of which is connected to ground. Coupled across primary 22 is a capacitor 23. Similarly, pickoff coils 11", 12", 8" and 7" are connected in series between ground and the input of an AC amplifier 24, the output of which is connected to one end of a primary 25 of transformer 14, the other end of which is connected to ground. Connected across primary 25 is a capacitor 26.

The operation of the radial support for the present three-axis magnetic suspension system may now be understood with reference to FIGURES 1 and 2. From FIGURE 2 it can be seen that the pickoff coil pairs are wound so as to oppose the corresponding drive coil pair. Thus, if the voltage drop across each drive coil of a pair is equal, the output of each corresponding pickoff coil is also equal, but since they are of opposite polarity, the output of the pickoff coil pair is zero. If, however, the voltage across the drive coils of a pair are not equal, the pickoff coil pair output will be proportional to the voltage difference.

Referring now to FIGURE 1, assume that rotor 1 and the attached ferrite ring 2 move to the right along the positive X axis. When this occurs, gap $X_n$, defined by the space between pole 10 and ferrite ring 2, and gap $X_b$, defined by the space between pole 9 and ferrite ring 2, decrease, where as gaps $X_a'$ and $X_b'$, defined by the spaces between poles 5 and 6 respectively, and ferrite ring 2, increase. However, if there is no motion in the Y direction, gap $X_a$ remains equal to gap $X_b$ and gap $X_n'$ remains equal to gap $X_b'$. As a result, the impedance of coils 9' and 10' and coils 5' and 6' remains equal so that no signal is generated in pickoff coils 9", 10" and 5", 6" wound no cores, 9, 10 and 5, 6. On the other hand, gaps $Y_a$ and $Y_a'$, defined by the spaces between poles 12 and 7, respectively, and ferrite ring 2, increase, while gaps $Y_b$ and $Y_b'$, defined by the spaces between poles 11 and 8, respectively, and ferrite ring 2, decrease. This results in a decrease in the impedance of coils 12' and 7', corresponding to the increase in gaps $Y_a$ and $Y_a'$, and a corresponding increase in the impedance of coils 11' and 8', corresponding to the decrease in gaps $Y_b$ and $Y_b'$. Thus, a difference voltage is generated in pickoff coils 11", 12" and 7", 8". Since coils 7", 8", 11" and 12" are connected in series, the difference voltage signal from each pickoff coil pair is added and applied to AC amplifier 24 where it is amplified and applied to primary 25 of transformer 14. In this manner, the difference voltage signal, indicating deflection along the X axis, is added to the drive signal for the X axis to force ferrite rotor 1 back to the left toward its center position. In other words, the feedback signal is such that the flux across gaps $X_a$ and $X_b$ is decreased and the flux across gaps $X_a'$ and $X_b'$ is increased so as to provide the aforementioned force to drive ferrite rotor 1 back to the left toward its center position. On the other hand, as explained previously, pickoff coils 5", 6", 9" and 10" along the X axis are insensitive to the feedback signal so that there is no closed loop tending to drive rotor 1 along the Y axis.

Similar circuity exists for the Y axis. In other words, if rotor 1 moves along the Y axis, no pickoff signal will result from coils 7", 8", 11" and 12". However, a signal will be generated in coils 5", 6", 9" and 10" which will be applied via amplifier 21 to transformer 19 to add to the drive signal for the Y axis to tend to drive rotor 1 back to its center position.

Referring now to FIGURE 3, there is shown a side view of the present magnetic bearing showing the manner in which axial support is provided. As seen in FIGURE 3, the pole faces of stators 3 and 3' and ferrite rings 2 and 2' are tapered in opposite directions. In addition, with reference to FIGURES 1 and 2, it will be appreciated that the four pairs of drive coils for each of stators 3 and 3' are effectively connected in parallel and that this parallel combination is connected in series with capacitor 16. This series LC circuit may then be tuned to the upper half power point of the resonance curve to provide a tuned circuit as described in the aforementioned patents to Kinsey et al. and Gilinson, Jr. As explained in those patents, if there is a tendency of rotor 1 to move to the right or left in FIGURE 3, the air gap at one end will increase and that at the other end will decrease. With a Q of 5–10, the force acting in the gap increases as the gap increases and decreases as the gap decreases thereby generating an effective centering on rotor 1 with respect to stators 3 and 3' along the axial axis. This is similar to the system described in the aforementioned patents except that only one capacitor is used for the four pairs of coils instead of four capacitors, thereby permitting the elimination of the critical matching produre heretofore required.

It may now be appreciated that according to the present invention there is provided a novel magnetic suspension system which combines passive and active circuitry to obtain three-axis support. Axial support is obtained with a passive resonant tuned system while radial support is obtained by means of a cross-axis pickoff system utilizing the same magnetic circuit required by the axial support. The windings on the stator are arranged so that there is no interaction between the axial and radial support systems, nor is there interaction between the two axes of the radial support system. From an inspection of FIGURES 1 and 2, it can be seen that the active servo system sees only the drive coil impedance and is not affected by the tuning capacitor which is connected to the transformer center tap. Thus, the drive coil impedance may be corrected for power factor at the drive transformer primary. It can also be seen from an inspection of FIGURES 1 and 2 that the resonant circuit comprised of capacitor 16 and the parallel drive coils 5'–12' does not see the servo signal because the resonant signal is applied to the transformer center tap and, in splitting through the secondary, does not generate a voltage on the primary.

The advantages of the present system over prior known systems containing a plurality of tuned circuits may now be fully appreciated. The present system permits the complete elimination of the critical match of the four capacitors for each end support. Such four capacitors are replaced by one whose absolute value and stability is significantly less extreme than the case with the previous four. In addition, the present system provides increased stiffness along the radial axes. The previous systems could increase stiffness only by increasing the circuit Q which required a proportionate increase in stability and selection requirements or by increasing the excitation voltage which increases the power requirements. With the present system, the stability and selection requirements are significantly eliminated permitting increased capacity along the radial axes. For a given Q, the load capacity of the present active system is two to four times that of the previous passive resonant systems.

While the invention has been described with respect to the preferred physical embodiment constructed in accordance therewith, it will be apparent to those skilled in the art that various modifications and improvements may be made without departing from the scope and spirit of the invention. Accordingly, it is to be understood that the invention is not to be limited by the specific illustrative embodiment but only by the scope of the appended claims.

I claim:
1. A system for magnetically suspending a rotary member comprising, in combination:
 a stationary member having eight pole members symmetrically located thereon, each of said pole members having a pair of windings wound thereon, one winding of each of said pairs constituting a drive coil and the other winding of each of said pairs constituting a pickoff coil, each of said drive coils being connected to one adjacent drive coil so as to provide four pairs of drive coils;
 a source of AC voltage;
 means for operatively coupling said four pairs of drive coils in parallel and to said source of AC voltage so as to magnetically suspend said rotary member radially along two orthogonal axes;
 means interconnecting said pickoff coils for providing an output indicating the displacement of said rotary members along said axes from a center position with respect to said stationary member; and
 means responsive to the output of said displacement indicating means for coupling a signal to said drive coils so as to drive said rotary member toward said center position.

2. The system of claim 1 wherein said rotary member and said stationary member are made of ferromagnetic materials.

3. The system of claim 1 wherein said pole members are spaced equidistantly around the circumference of said stationary member.

4. The system of claim 1 wherein the two drive coils of each of said pairs of drive coils are connected in series.

5. The system of claim 1 wherein said rotary and stationary members are coaxial, cylindrical members, one of said members being hollow, the other of said members being positioned in the hollow portion of said one member, and wherein the inner surface of said one member and the outer surface of said other member are tapered in opposite directions, and further comprising:
 a tuning capacitor operatively coupled in series between said four pairs of drive coils and said source of AC voltage, said capacitor and said drive coils forming a passive tuned circuit for supporting said rotary member axially.

6. The system of claim 1 wherein a first two of said pairs of drive coils are positioned on opposite sides of said stationary member so as to suspend said rotary member radially along a first axis, and wherein a second two of said pairs of drive coils are displaced 90° from said first two pairs and positioned on opposite sides of said stationary member so as to suspend said rotary member along a second, orthogonal axis.

7. The system of claim 6 wherein said rotary and stationary members are coaxial, cylindrical members, one of said members being hollow, the other of said members being positioned in the hollow portion of said one member, and wherein the inner surface of said one member and the outer surface of said other member are tapered in opposite directions, and further comprising:
a tuning capacitor operatively coupled in series between said four pairs of drive coils and said source of AC voltage, said capacitor and said drive coils forming a passive tuned circuit for supporting said rotary member along a third axis which is perpendicular to said first and second axes.

8. The system of claim 6 wherein said means interconnecting said pickoff coils comprises:
means for connecting each of said pickoff coils to one adjacent pickoff coil so as to provide four pairs of pickoff coils corresponding to said four pairs of drive coils, said pairs of pickoff coils being connected so as to oppose the corresponding drive coil pair whereby each pickoff coil pair provides a signal indicative of the voltage difference between the coils of the corresponding drive coil pair, said voltage difference signal being indicative of the displacement of said rotary member from said center position, the pair of pickoff coils along said first axis providing an output indicating the displacement of said rotary member along said second axis and the pair of pickoff coils along said second axis providing an output indicating the displacement of said rotary member along said first axis.

9. The system of claim 8 wherein the two drive coils of each of said pairs of drive coils are connected in series and wherein the two pickoff coils of each of said pairs of pickoff coils are connected in series, the series connection between the pickoff coils of each of said pairs being opposite to the series connection between the drive coils of the corresponding drive coil pair.

10. The system of claim 8 wherein said means for coupling said four pairs of drive coils in parallel and to said source of AC voltage comprises:
a first transformer having a primary and a center-tapped secondary, said first two pairs of drive coils being connected to opposite ends of said secondary of said first transformer;
a second transformer having a primary and a center-tapped secondary, said second two pairs of drive coils being connected to opposite ends of said secondary of said second transformer; and
means for operatively coupling the center-taps of the secondaries of said first and second transformers to each other and to said source of AC voltage.

11. The system of claim 10 wherein said means for coupling a signal to said drive coils comprises:
means for operatively coupling said pair of pickoff coils along said first axis to said primary of said second transformer whereby said output indicating the displacement of said rotary member along said second axis is added to the signal applied to said first two pairs of drive coils so as to drive said rotary member toward said center position; and
means for operatively coupling said pair of pickoff coils along said second axis to said primary of said first transformer whereby said output indicating the displacement of said rotary member along said first axis is added to the signal applied to said second two pairs of drive coils so as to drive said rotary member toward said center position.

12. The system of claim 10 wherein said rotary and stationary members are coaxial, cylindrical members, one of said members being hollow, the other of said members being positioned in the hollow portion of said one member, and wherein the inner surface of said one member and the outer surface of said other member are tapered in opposite directions, and further comprising:
a tuning capacitor, and wherein said means for operatively coupling the center-taps of the secondaries of said first and second transformers to said source of AC voltage is operative to couple said center-taps to a first side of said tuning capacitor, the other side of said tuning capacitor being coupled to said source.

13. The system of claim 6 wherein said means for coupling said four pairs of drive coils in parallel and to said source of AC voltage comprises:
a first transformer having a primary and a center-tapped secondary, said first two pairs of drive coils being connected to opposite ends of said secondary of said first transformer;
a second transformer having a primary and a center-tapped secondary, said second two pairs of drive coils being connected to opposite ends of said secondary of said second transformer; and
means for operatively coupling the center-taps of the secondaries of said first and second transformers to each other and to said source of AC voltage.

14. A system for magnetically suspending a cylindrical rotor at two points along the axis thereof, the suspension system at each of said two points comprising, in combination:
a stationary member having eight pole members symmetrically located thereon, each of said pole members having a pair of windings wound thereon, one winding of each of said pairs constituting a drive coil and the other winding of each of said pairs constituting a pickoff coil, each of said drive coils being connected to one adjacent drive coil so as to provide four pairs of drive coils;
a source of AC voltage;
means for operatively coupling said four pairs of drive coils in parallel and to said source of AC voltage so as to magnetically suspend said rotary member radially along two orthogonal axes;
means interconnecting said pickoff coils for providing an output indicating the displacement of said rotary member along said axes from a center position with respect to said stationary member; and
means responsive to the output of said displacement indicating means for coupling a signal to said drive coils so as to drive said rotary member toward said center position.

15. The system of claim 14 wherein said rotary member and the stationary members along the axis thereof are coaxial, cylindrical members, said rotary member being hollow, said stationary members being positioned in the hollow portion of said rotary member, and wherein the pole members of one of said stationary members and the inner surface of said rotary member adjacent said one stationary member are tapered in opposite directions, and wherein the pole members of the other of said stationary members and the inner surface of said rotary member adjacent said other stationary member are tapered in opposite directions, said stationary members being tapered in opposite directions, and further comprising:
a first tuning capacitor operatively coupled in series between said four pairs of drive coils and said source of AC voltage associated with said one stationary member; and
a second tuning capacitor operatively coupled in series between said four pairs of drive coils and said source of AC voltage associated with said other stationary member, said capacitors and said drive coils forming a pair of tuned circuits for supporting said rotary member axially.

References Cited
UNITED STATES PATENTS

| | | | | |
|---|---|---|---|---|
| 2,874,309 | 2/1959 | Staak | | 310—67 |
| 3,254,537 | 6/1966 | Elwell | | 74—5.6 |
| 3,324,732 | 6/1967 | Dillon | | 74—5.6 |
| 3,338,644 | 10/1967 | Atkinson | | 308—10 |
| 3,370,205 | 2/1968 | Dukes | | 308—10 |

WARREN E. RAY, Primary Examiner

R. SKUDY, Assistant Examiner

U.S. Cl. X.R.

74—5.46; 310—67, 179